United States Patent Office 3,055,903
Patented Sept. 25, 1962

---

3,055,903
2 - ALKYL MERCAPTO - 9 - (N-ALKYL-PIPERIDYL-IDENE-4'-THIOXANTHENES AND THE ACETATE SALTS THEREOF
Jany Renz, Jean-Pierre Bourquin, Rudolf Griot, Leo Ruesch, and Gustav Schwarb, all of Basel, Switzerland, assignors to Sandoz Ltd., Basel, Switzerland, a Swiss firm
No Drawing. Filed Feb. 8, 1961, Ser. No. 87,783
Claims priority, application Switzerland Feb. 25, 1960
3 Claims. (Cl. 260—293.4)

The present invention relates to new thiaxanthene derivatives, their acid addition salts and a process for their production.

The new thiaxanthene derivatives of the present invention correspond to the Formula I

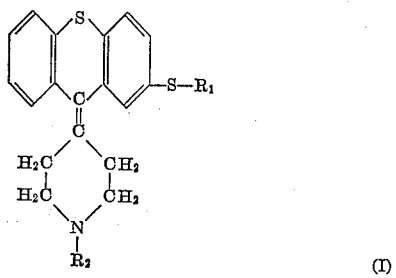

wherein each of $R_1$ and $R_2$ represents a member selected from the group consisting of alkyl radicals containing from 1 to 4 carbon atoms.

The aforesaid thiaxanthene derivatives of the Formula I are prepared according to this invention by reacting a thiaxanthone derivative of the Formula II

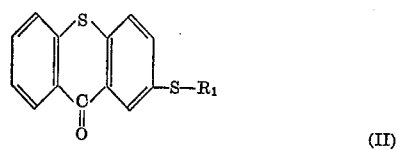

wherein $R_1$ has the above significance, with a metal organic halide of the Formula III

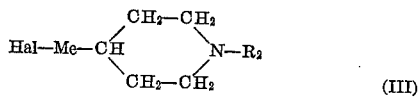

wherein $R_2$ has the above significance, Me is a bivalent metal selected from the group of magnesium or an alloy thereof, and Hal is halogen selected from the group consisting of chlorine, bromine and iodine, the reaction product is hydrolysed to give a thiaxanthenol derivative of the Formula IV

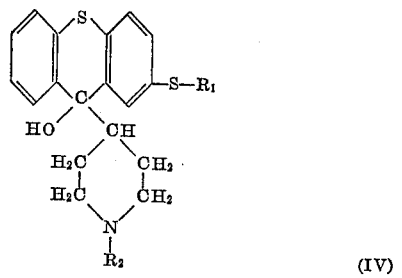

wherein $R_1$ and $R_2$ each have the above significance. The intermediate product of Formula IV is treated with a dehydrating agent capable of splitting off the elements of water from it, whereby Compound I is recovered. The resulting compound, if desired, may be converted into its acid addition salts, e.g. by reaction with an acid, for example hydrochloric, hydrobromic, sulphuric, citric, oxalic, tartaric, succinic, maleic, acetic, benzoic, hexahydrobenzoic, methanesulphonic, or fumaric.

The process of the invention may be effected, for example, in such a way that a solution of 1-methyl-4-chloro-piperidine in an anhydrous cyclic ether, for example tetrahydrofuran, is mixed with magnesium turnings which have been activated with iodine vapour. Subsequently the reaction mixture is heated to the boil at reflux for several hours.

Instead of iodine-activated magnesium it is also possible to use a magnesium copper alloy (according to Gilman). The thiaxanthone derivative of the Formula II is then added to the resulting Grignard solution and the reaction mixture heated for several hours. Subsequently the solvent is removed in a vacuum, the reaction mixture is treated with aqueous ammonium chloride solution and subsequently extracted with an organic solvent which is immiscible with water, preferably chloroform. After drying the solution, the solvent is evaporated and the resulting intermediate product, the thiaxanthenol-(9) derivative, purified according to known methods, for example by chromatographic adsorption and subsequent crystallisation. Splitting off of the water is effected by heating with a dehydration agent, for example phosphorus oxychloride or phosphorus pentachloride. In order to isolate the end product, the reaction mixture is cooled to room temperature, run into ice, made alkaline with an alkali hydroxide solution and extracted with a water-immiscible organic solvent, preferably chloroform. After removing the solvent, the end product is purified by distillation at a reduced pressure and, if desired, converted into an acid addition salt.

The thiaxanthene derivatives of the invention at room temperature are oily or solid. They are basic compounds which form salts with acids most of which are crystalline and stable at room temperature.

The thiaxanthene derivatives I above have interesting pharmacodynamic properties. For example, the exemplified compounds have narcosis-potentiating, adrenolytic, sedative, antihistamine-like, antipyretic and hypothermal effects.

The thiaxanthone derivatives of the Formula II used as starting materials are produced in that an S-alkyl-p-halogenothiophenol containing at most four carbon atoms in the alkyl group, is condensed with thiosalicylic acid in the presence of copper and an alkali carbonate. The condensation product is converted into its acid chloride and cyclised with aluminum chloride in an inert solvent, for example nitrobenzene.

In the following example a compound of the Formula I is illustrated wherein $R_1$ and $R_2$ are methyl, but these may also include $R_1$=ethyl, propyl and butyl and $R_2$=ethyl, propyl and butyl.

In the following example, which illustrates the invention but in no way limits it, all temperatures are stated in degrees centigrade and are uncorrected.

EXAMPLE

*2-Methylmercapto-9-(N-Methyl-Piperidylidene-4')-Thiaxanthene*

In order to produce the starting material, 2-methyl-mercapto-thiaxanthone-(9) (melting point 124–126°), thiosalicylic acid is condensed with p-bromothioanisol in in the presence of copper and potassium carbonate. The reaction product is converted to the acid chloride by means of thionyl chloride and cyclisation is effected with aluminium chloride in nitrobenzene.

4.86 g. of magnesium turnings, which have been dried at 120° and activated with iodine vapours in a well dried apparatus are covered with 50 cc. of absolute tetrahydrofuran containing 6 drops of bromine and treated during 1¾ hours with a solution of 26.7 g. of 1-methyl-4-chloropiperidine in 50 cc. of absolute tetrahydrofuran. After the addition is complete, heating to the boil at reflux for a further 14½ hours is effected, whereby the magnesium dissolves. By means of an extraction apparatus 11.07 g. of 2-methylmercapto-thiaxanthone (M.P. 124–126°) are added and subsequently heating to the boil is effected for 15 hours. After filtration, the solution is reduced in volume in a vacuum, the organo-magnesium compound is treated with an ice-cold ammonium chloride solution and the reaction product extracted with chloroform. The extract which has been reduced to a small volume, is chromatographed on aluminium oxide, whereby 2-methyl-mercapto-9-(N-methyl-piperidyl-4')-thiaxanthenol-(9) is obtained by elution with chloroform. The compound melts after recrystallisation from absolute ethanol at 198–198.5°. 3.13 g. of the resulting product are heated to the boil at reflux with 14.6 g. of POCl₃ for 5¼ hours. After cooling, the mixture is run into ice, made alkaline with 100 cc. of concentrated sodium hydroxide solution and the resulting suspension is extracted with chloroform. After drying the chloroform extract and removal of the solvent, the residue is distilled, whereby 2-methylmer-capto-9-(N-methyl-piperidylidene-4')-thiaxanthene distils over at a pressure of 0.04 mm. of Hg and a bath temperature of 180–190° in the form of a light yellow oil. After recrystallisation from methanol the compound melts at 99–100°.

In order to produce the acetate, the thiaxanthene derivative is mixed with an equivalent amount of glacial acetic acid in absolute ether. After cooling, the acetate of 2-methylmercapto-9-(N-methyl-piperidylidene-4')-thiaxanthene crystallises out, melting point 118–119° (decomposition, unclear).

Having thus disclosed the invention, what is claimed is:

1. A thiaxanthene of the formula,

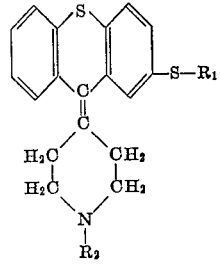

wherein each of $R_1$ and $R_2$ is an alkyl radical containing from 1 to 4 carbon atoms.

2. 2-methylmercapto-9-(N-methyl-piperidylidene - 4')-thiaxanthene.

3. 2-methylmercapto-9-(N-methyl-piperidylidene - 4')-thiaxanthene acetate.

References Cited in the file of this patent

Petersen et al.: Arzneimittel Forschung, vol. 8, No. 7, page 396 (July 1958).

Derwent Commonwealth Patents Report, vol. 187, South African Patents Advertised, Group 3A—page 3, abstract 59/4778, issued May 13, 1960.